United States Patent
Li et al.

(10) Patent No.: US 11,886,910 B2
(45) Date of Patent: Jan. 30, 2024

(54) DYNAMIC PRIORITIZATION OF SYSTEM-ON-CHIP INTERCONNECT TRAFFIC USING INFORMATION FROM AN OPERATING SYSTEM AND HARDWARE

(71) Applicant: Intel Corporation, Santa Clara, CA (US)

(72) Inventors: Yanru Li, San Diego, CA (US); William Zand, Garden Grove, CA (US); Thomas Klingenbrunn, San Diego, CA (US); Ali Taha, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 16/728,175

(22) Filed: Dec. 27, 2019

(65) Prior Publication Data

US 2021/0200579 A1 Jul. 1, 2021

(51) Int. Cl.
G06F 9/46 (2006.01)
G06F 9/48 (2006.01)
G06F 12/1009 (2016.01)
G06F 13/16 (2006.01)

(52) U.S. Cl.
CPC ............ *G06F 9/4881* (2013.01); *G06F 9/466* (2013.01); *G06F 12/1009* (2013.01); *G06F 13/1605* (2013.01); *G06F 2213/0038* (2013.01)

(58) Field of Classification Search
CPC .... G06F 9/4881; G06F 9/466; G06F 12/1009; G06F 13/1605; G06F 2213/0038
See application file for complete search history.

(56) References Cited

U.S. PATENT DOCUMENTS

| | | | | |
|---|---|---|---|---|
| 9,098,203 | B1* | 8/2015 | Kedem | .................. G06F 13/18 |
| 2012/0240112 | A1* | 9/2012 | Nishiguchi | ......... G06F 9/45558 718/1 |
| 2013/0191617 | A1* | 7/2013 | Ishikawa | ............... G06F 9/4881 712/216 |
| 2017/0220384 | A1* | 8/2017 | Anderson | ............. G06F 9/4893 |
| 2020/0379816 | A1* | 12/2020 | Lin | ....................... G06F 9/5072 |
| 2021/0049062 | A1* | 2/2021 | Balakrishnan | ...... G06F 11/1016 |

OTHER PUBLICATIONS

ARM Limited, "ARM® System Memory Management Unit Architecture Specification", SMMU architecture version 3.0 and version 3.1, Document No. IHI 0070B, 2017, 427 pages.

\* cited by examiner

*Primary Examiner* — Emerson C Puente
*Assistant Examiner* — Jonathan R Labud
(74) *Attorney, Agent, or Firm* — Nicholson De Vos Webster & Elliott LLP

(57) ABSTRACT

Embodiments of apparatuses and methods for dynamic prioritization of interconnect traffic in a system-on-chip are described. In an embodiment, an apparatus includes first circuitry to use a first weight value to weight operating system priority information to generate a first weighted priority value, second circuitry to use a second weight value to weight system-on-chip (SoC) hardware priority information to generate a second weighted priority value, third circuitry to sum the first weighted priority value and the second weighted priority value to generate a quality of service (QoS) value for an SoC interconnect transaction, and an arbiter to use the QoS value to prioritize the SoC interconnect transaction on an SoC interconnect.

17 Claims, 11 Drawing Sheets

|  | Response Mode $a_n$ | Energy Saving Mode $a_n$ | Big Core 102C | Big Core 102D | Little Core 102A | Little Core 102B |
|---|---|---|---|---|---|---|
| $QoS_{input_0}$ OS Urgency 201 | 90% | 60% | 1 | 0 | 1 | 6 |
| $QoS_{input_1}$ Energy Efficiency 204 | 10% | 40% | 1 | 2 | 3 | 5 |
| $QoS_{output}$ Responsive Mode | | | 1.00 | 0.00 | 1.20 | 5.90 |
| $QoS_{output}$ Energy Saving Mode | | | 1.00 | 0.00 | 2.20 | 5.40 |

FIG. 2B

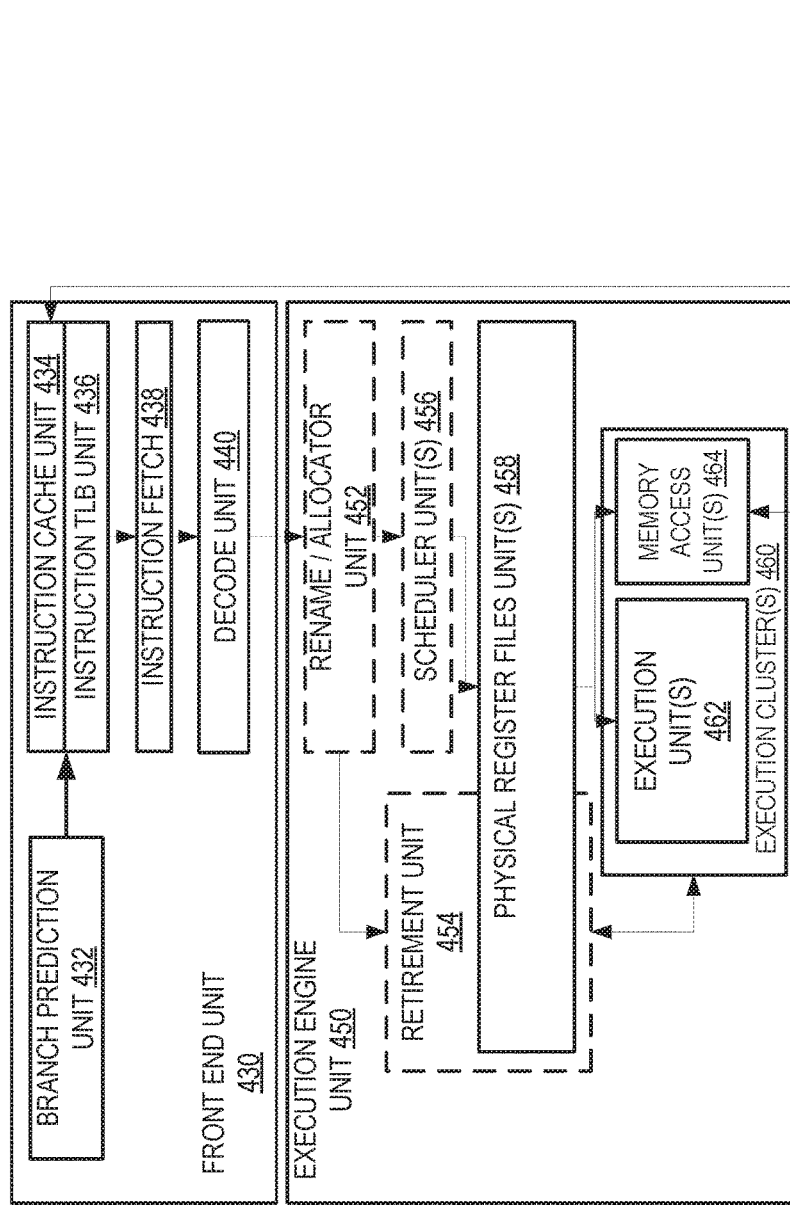
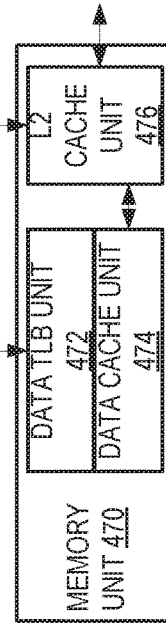
FIG. 4A
FIG. 4B

DYNAMIC PRIORITIZATION OF SYSTEM-ON-CHIP INTERCONNECT TRAFFIC USING INFORMATION FROM AN OPERATING SYSTEM AND HARDWARE

FIELD OF INVENTION

The field of invention relates generally to information processing, and, more specifically, but without limitation, to quality of service on information processing systems.

BACKGROUND

An information processing system may include multiple processors, processor cores, and/or execution cores (generally, "cores") on the same semiconductor die (a system-on-chip or SoC), providing the potential for each core to be running software, software threads, processes, work, jobs, tasks, etc. (generally, "tasks"), possibly in parallel, concurrently, and/or within the same time period, such that the prioritization of tasks, the scheduling of tasks on cores, and/or the prioritization of cores for the use of system resources may have an impact on performance, power consumption, and/or quality of service, particularly if the SoC includes different types of cores (a heterogeneous SoC).

BRIEF DESCRIPTION OF THE DRAWINGS

The present invention is illustrated by way of example and not limitation in the figures of the accompanying drawings, in which like references indicate similar elements and in which:

FIG. 2B is a table illustrating a quality of service control logic and algorithm according to an embodiment of the invention;

FIG. 4A is a block diagram illustrating both an exemplary in-order pipeline and an exemplary register renaming, out-of-order issue/execution pipeline according to embodiments of the invention;

FIG. 4B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
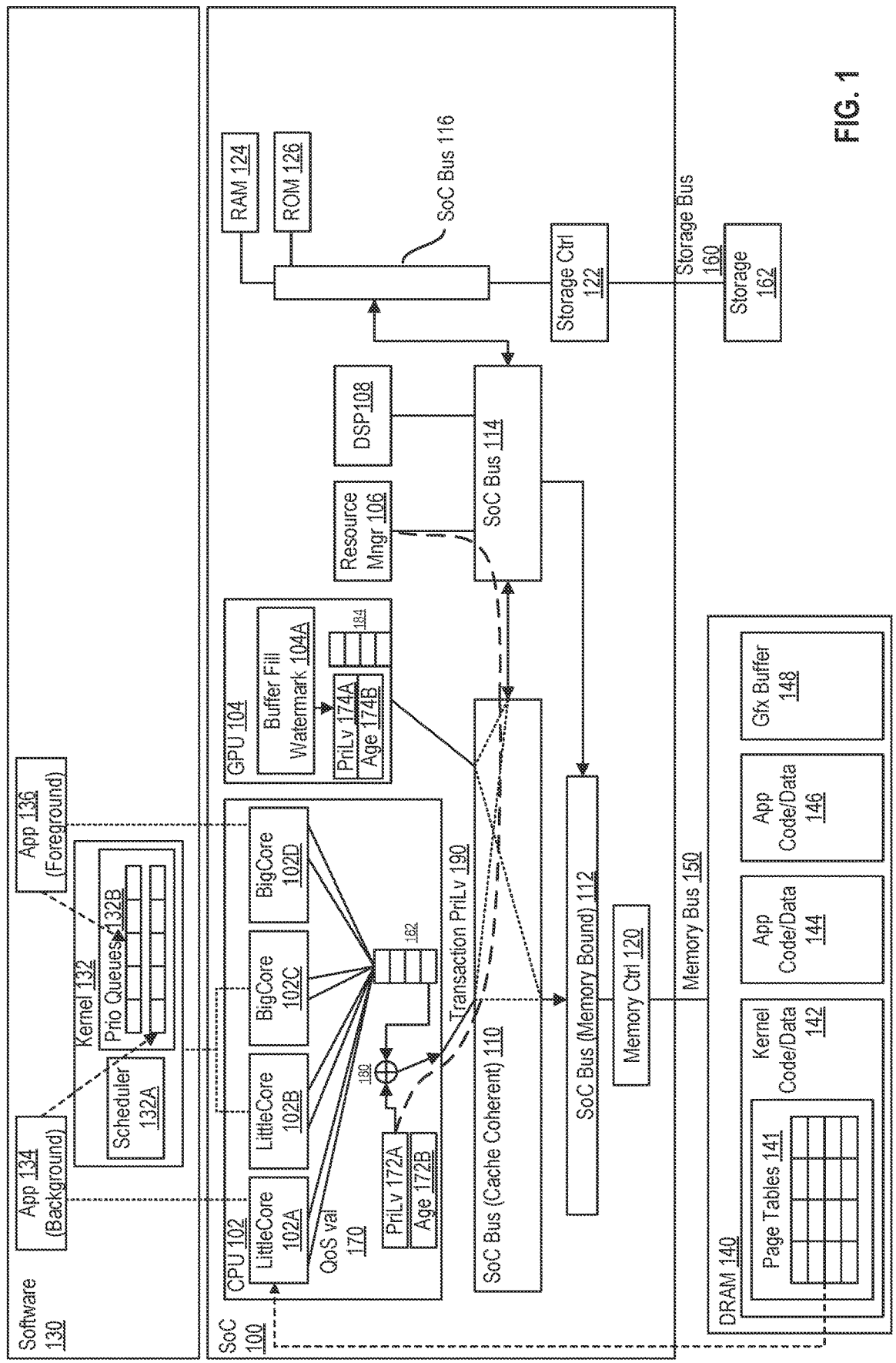
FIG. 1 is a diagram illustrating a system-on-chip according to an embodiment of the invention.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

As discussed in the background section, an SoC may include multiple cores, which may differ in their purpose (e.g., a general-purpose application processor core versus a special-purpose graphics processor core), instruction set architecture (ISA), performance, power consumption, and/or some other processing metric or capability. The differences may be provided by the architecture, size, speed, and/or microarchitecture of the core and/or its features. In such a system, one or more cores may be referred to as "big"

because they are capable of providing, they may be used to provide, and/or their use may provide and/or result in a greater level of performance, power consumption, and/or some other measure than one or more other "small" or "little" cores in the system.

In such heterogeneous SoCs and/or any other multicore SoCs, a variety of prioritization approaches may be employed in efforts to optimize, improve, and/or manage quality of service (QoS), performance, power consumption, and/or some other measure. For example, tasks may be prioritized by an operating system (OS) for scheduling and/or transactions may be prioritized by hardware for access to resources such as an SoC interconnect. Embodiments of the invention may provide an approach to prioritization that may be desired because it uses information from software and hardware such that task priority may be considered in prioritizing the routing of interconnect traffic, along with a variety of other factors, such as transaction request priority, transaction request aging (how long it has been waiting, to avoid starvation), system memory (e.g., double-data rate synchronous dynamic random-access memory or DDR SDRAM) page hits/misses (for system memory bound transaction requests), and interconnect congestion (level of pressure). Therefore, embodiments of the invention may provide for OS level QoS settings, for example, treating the foreground and background applications or tasks differently, to be adjusted dynamically based on SoC interconnect congestion and other hardware and platform characteristics, then used in arbitration for the use of an SoC interconnect. Furthermore, embodiments of the invention may provide for the prioritization and/or routing of interconnect traffic to consider task prioritization by software but be performed dynamically by hardware without delays due to re-prioritization of tasks by software.

FIG. 1 is a diagram illustrating an SoC 100 according to an embodiment of the invention. SoC 100 includes central processing unit (CPU) 102 having little cores 102A and 102B and big cores 102C and 102D. Although FIG. 1 depicts particular features of an SoC, many variations are possible within various embodiments, such as those in which CPU 102, core 102A, core 102B, core 102C, and/or core 102D may correspond to any of core 490 in FIG. 4B, cores 502A to 502N in FIG. 5, processors 610/615 in FIG. 6, processors 770/780 in FIGS. 7 and 8, and/or cores 902A to 902N in FIG. 9, each as described below, and/or SoC 100 may correspond to SoC 900 in FIG. 9 as described below.

SoC 100 also includes graphics processing unit (GPU) 104 (which may include buffer fill watermark 104A and GPU transaction request queue 184), resource manager 106, digital signal processor (DSP) 108, memory controller 120, storage controller 122, random-access memory (RAM) 124, read-only memory (ROM) 126, and SoC interconnects (e.g., buses) 110, 112, 114, and 116. SoC 100, as depicted in FIG. 1, may be included in a system that also includes software 130 (including applications 134 and 136 as well as kernel 132 including scheduler 132A and priority queues 132B), system memory (e.g., dynamic random-access memory or DRAM) 140 (including application code/data 144 for application 134, application data/code 146 for application 136, graphics buffer 148, and kernel code/data 142 including page tables 141) connected to SoC 100 by memory bus 150, and storage 162 connected to SoC 100 by storage bus 160.

In SoC 100, QoS control logic 180 may represent a logic to take the input from both OS kernel 132 and SoC hardware and to generate SoC interconnect-level QoS output 190 based on the inputs according to a programmable algorithm. The algorithm may be statically configured at boot up and dynamically generate QoS output 190 at runtime, which may be used as a priority level for CPU 102 transactions in arbitrating for the use of an SoC interconnect (e.g., 110, 112, 114, and/or 116), without interrupting resource manager 106 when CPU 102 changes a QoS value 170 from any of cores 102A-D (in contrast to an approach in which OS kernel 132 provides task priority information to resource manager 106, according to which resource manager 106 adjusts the priority level for CPU 102 transactions). Arbitration for the use of the SoC interconnect may also include requests from GPU 104 (e.g., considering priority level 174A and/or age 174B) and/or any other IP blocks or agents on the SoC interconnect.

Embodiments of the invention provide for QoS control logic 180 to receive inputs and information related to software, hardware, and the platform, directly and indirectly, from and/or including priority levels of CPU core requests (represented by priority level 172A), age of CPU core requests (represented by age 172B), CPU core transaction request queue 182, kernel level QoS settings, interconnect level QoS settings, performance, power consumption, thermal status, etc., as further described above and below. Furthermore, embodiments may provide for QoS control logic 180 to be configured or programmed (e.g., at boot up) to weigh and/or consider relationships between/among the inputs and information as further described below, and dynamically adjust the priority levels of transactions on the SoC interconnect at runtime.

Figure 2A:
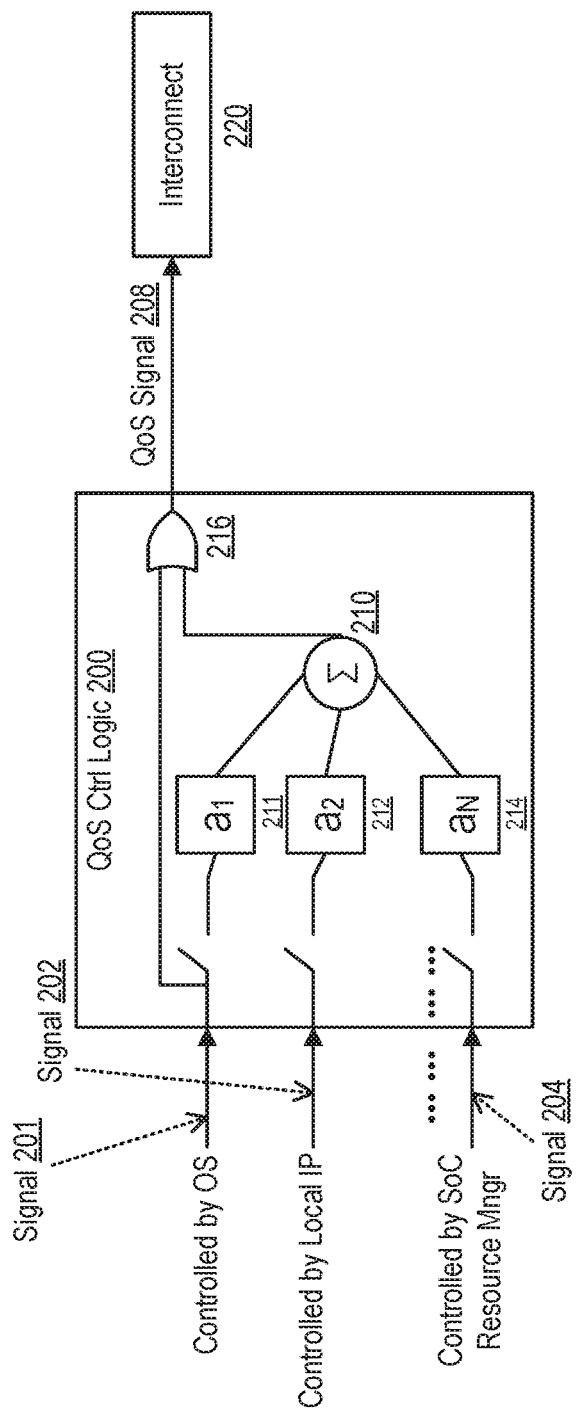
FIG. 2A is a diagram illustrating a quality of service control logic and algorithm according to an embodiment of the invention.

FIG. 2A is a diagram illustrating an apparatus, QoS control logic 200, according to an embodiment of the invention. The apparatus shown in FIG. 2A may be implemented in logic gates and/or any other type of circuitry, all or parts of which may be integrated into the circuitry of a processing device or any other apparatus in a computer or other information processing system. For example, the apparatus may be implemented in an SoC (such SoC 100 in FIG. 1 or SoC 900 in FIG. 9).

In FIG. 2A, QoS control logic 200 may receive any number of input signals. Shown are input signals 201, 202, and 204. Input signal 201 may be controlled by an OS, for example as described below. Input signal 202 may be controlled by a local intellectual property (IP) block, for example as described below. Input signal 204 may be controlled by an SoC resource manager, such as SoC resource manager 106 in FIG. 1, for example as described below. Output signal 208 may be connected to an SoC interconnect and/or interconnect arbiter for use in prioritizing transactions and/or requests associated with the processor, IP block, or agent that includes QoS control logic 200 (e.g., CPU 102 in an embodiment in which QoS control logic 200 corresponds to QoS control logic 180 in FIG. 1) and/or arbitrating, for use of the interconnect, between/among transactions and/or requests associated with that processor, IP block, or agent and other processor(s), IP block(s), and/or agent(s) (e.g., GPU 104 and DSP 108 in FIG. 1) in the SoC. Note that none of input signals 201, 202, 204, etc. must terminate at QoS control logic 200; in various embodiments, one or more may propagate to and be used by other SoC components (e.g., a last-level cache in a cache hierarchy).

In an embodiment, input signal 201 may be controlled by an OS using bits in page table entries (e.g., in page tables 141 in FIG. 1), cache tags, task identifiers, thread identifiers, process identifiers, context identifiers to indicate a priority level. For example, a kernel may set designated bits (e.g., bits 62:60 according to an ARM page-based hardware attributes (PBHA) mechanism) of a page table entry to indicate a priority level of the code/data of the corresponding page. Then, when the CPU accesses the page, it decodes the bits to determine the priority level and sets the level of input signal 201 based on the priority level.

In an embodiment, input signal 202 may represent an input signal controlled by a CPU core (e.g., one of core 102A, 102B, 102C, or 102D), and QoS control logic may receive any number (including zero) of additional input signals from a number (including zero) of additional cores. In another embodiment, input signal 202 may represent an input signal controlled by a CPU core cluster, and QoS control logic may receive any number (including zero) of additional input signals from any number (including zero) of additional CPU core clusters.

In an embodiment, input signal 204 may be controlled by an SoC resource manager (e.g., SoC resource manager 106 in FIG. 1) according to the system profile, such as the energy efficiency per core. For example, if the system has a higher power consumption on the big cores 102C and 102D than the little cores 102A and 102B, and the system would like to optimize for energy efficiency, then the SoC resource manager 106 may configure a higher value for the signal 204 for the big cores 102C and 102D than those of the little cores 102A and 102B.

In an embodiment, output signal 208 may be generated based on the input signals according to a programmable algorithm implemented with logic gates, circuitry, or hardware such as circuitry 211, 212, 213, 210, and 216. Each input may be given a coefficient an, and each input value may be weighted with the corresponding coefficient before being summed with the other weighted inputs to generate the output signal. For example, the following pseudocode may represent the operation of QoS control logic 200:

if $QoS_{input\_201}=0$ then $QoS_{output\_208}=0$
else $QoS_{output\_208}=\Sigma(n=1$ to $N)$ $a_n QoS_{input\_n}$ For example, a simplified implementation of such an algorithm may take only an OS priority signal 201 and an energy efficiency signal 204 as inputs, and a light compute but latency sensitive task may be scheduled on little core 102A, a normal priority task may be scheduled on big core 102C, and a background task may be scheduled on little core 102B. The table in FIG. 2B illustrates an example of the algorithm, with all inputs normalized to a maximum value of 7. In this example, for a high priority task, the QoS for the task on the big core 102D has no impact, keeping the output 0, but the QoS for the tasks on the other cores does have an impact.

Figure 2C:
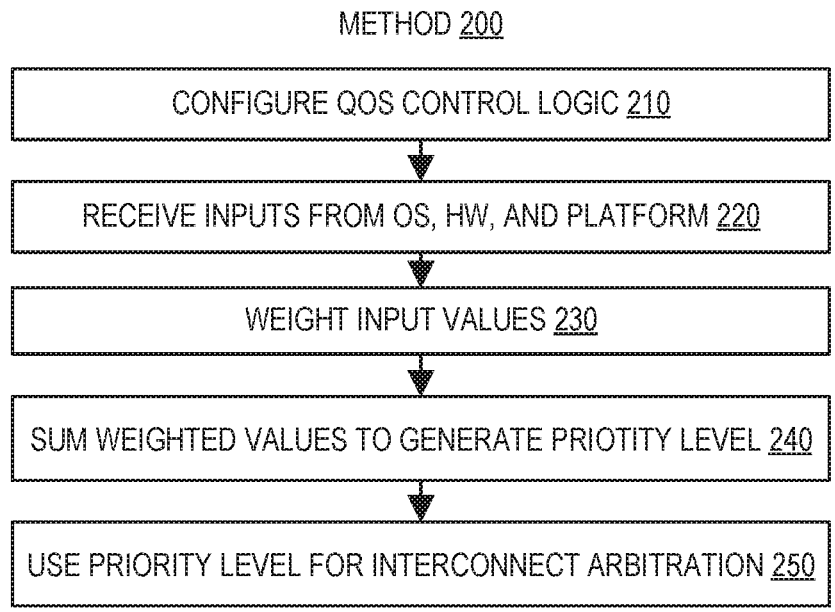
FIG. 2C is a diagram illustrating a method for dynamic prioritization of interconnect traffic in a system-on-chip according to an embodiment of the invention.

FIG. 2C illustrates a method 200 for dynamic prioritization of interconnect traffic in an SoC according to an embodiment of the invention. In 210, a QoS control logic (e.g., QoS control logic 180 in FIG. 1 or 200 in FIG. 2A) is configured. In 220, the QoS control logic receives inputs from the OS, SoC hardware, and platform. In 230, the QoS control logic weights the input values. In 240, the QoS control logic sums the weighted input values to generate a priority level for an interconnect transaction. In 250, the priority level is used in arbitration for use of an SoC interconnect.

Figure 3:
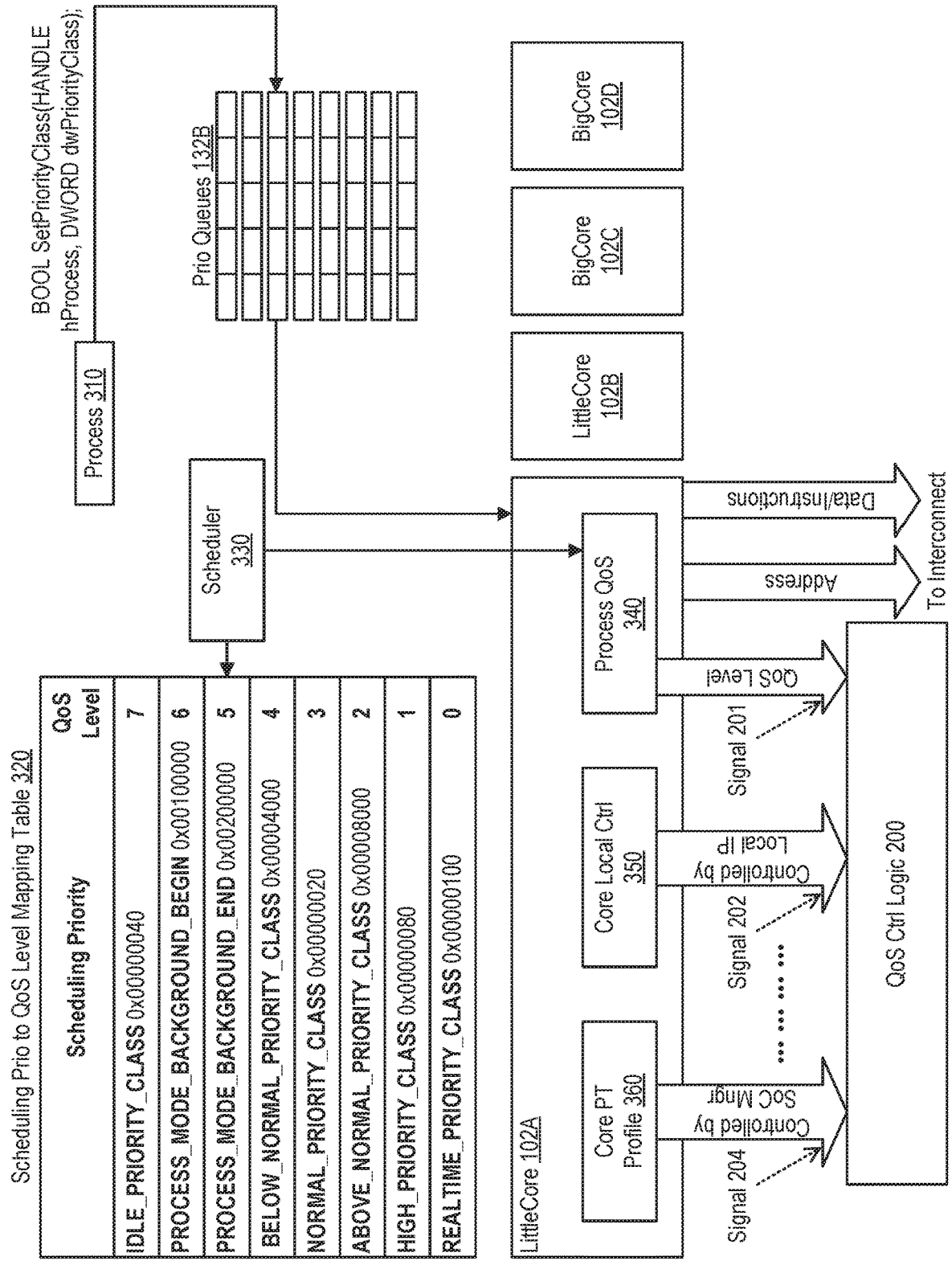
FIG. 3 is a diagram illustrating a quality of service control logic as it may be configured within a system-on-chip, according to an embodiment of the invention.

FIG. 3 is a diagram illustrating a QoS control logic, such as QoS control logic 200, as it may be configured within an SoC, such as SoC 100, according to an embodiment of the invention. In the embodiment of FIG. 3, an example in which QoS control logic receives inputs for assigning a priority level to an SoC interconnect transaction from little core 102A. In this example, QoS control logic input signals 201, 202, and 204 are based on process QoS register 340, core local control register 350, and core PT profile register 360, respectively, in little core 102A.

For example, to configure QoS at a per process granularity, a process 310 may be inserted into a priority queue 132B with a corresponding priority set using the Windows OS definition of "priority class" and API:

BOOL SetPriorityClass(
    HANDLE hProcess,
    DWORD dwPriorityClass
);

A process scheduling priority to QoS mapping table may be used to map the scheduling priority to a QoS level. The mapping table may be customized per device vendor or per SoC vendor. Mapping table 320 shows an example of a high scheduling priority mapped to a high QoS level. When the OS scheduler 310 starts or switches a process to execute on a certain core, in this example little core 102A, the conversion from the scheduling priority level into QoS level may be done either by pre-configured hardware or by the scheduler, and the scheduler may write to process QoS register 340 so that the proper QoS signal 201 will be sent with any read/write transaction while the process is running on this core.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
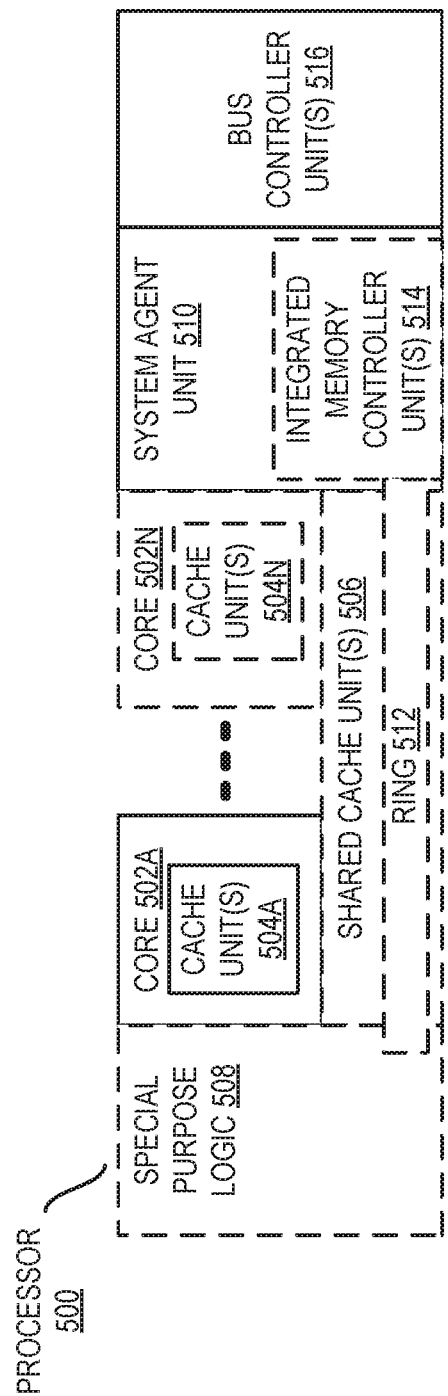
FIG. 5 is a block diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
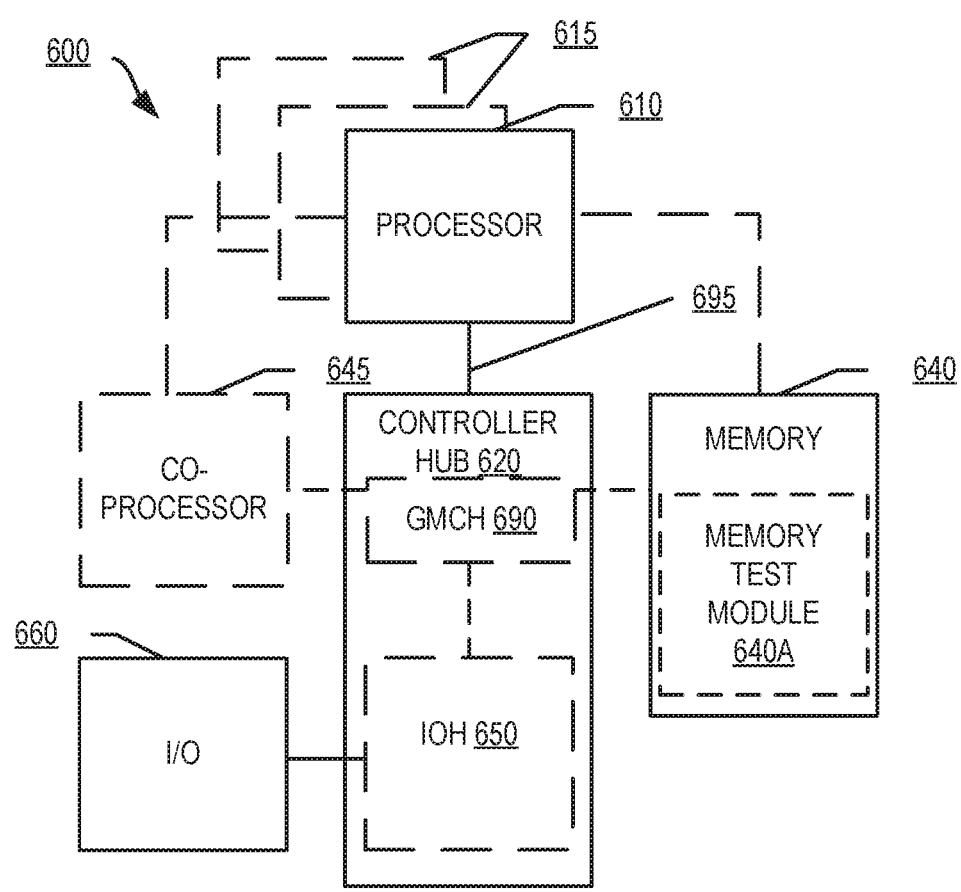
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
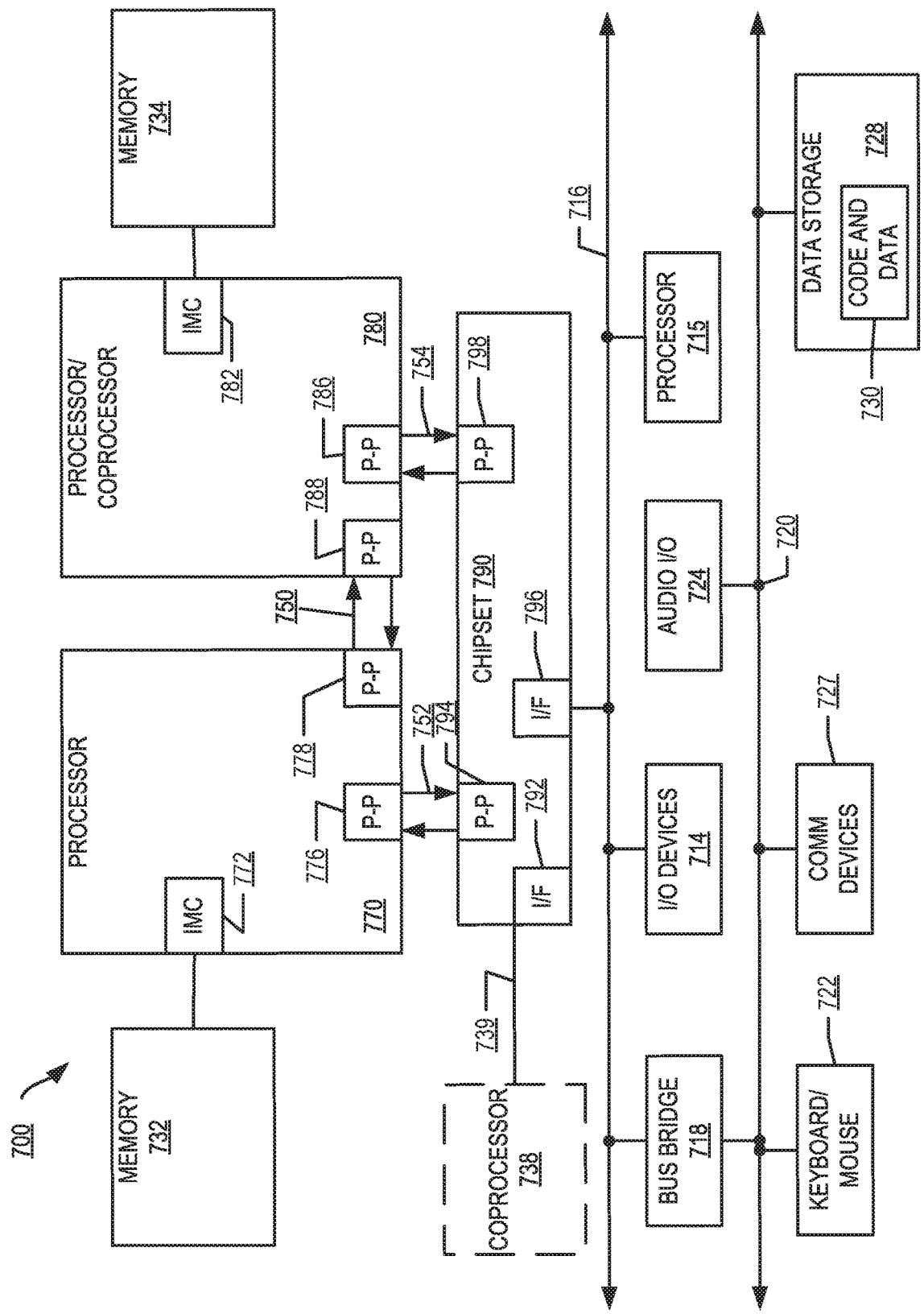
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
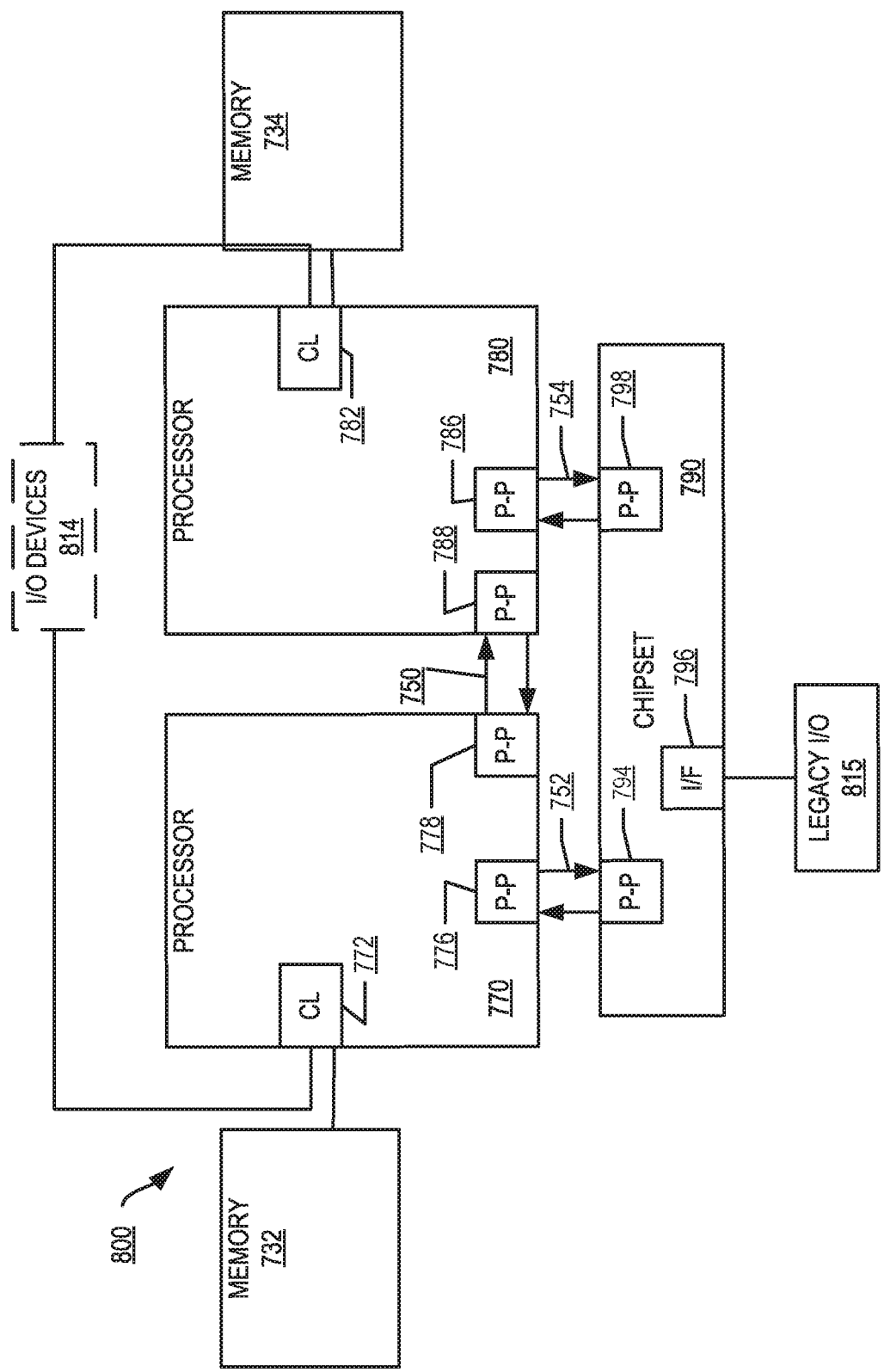
FIG. 8 is a block diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
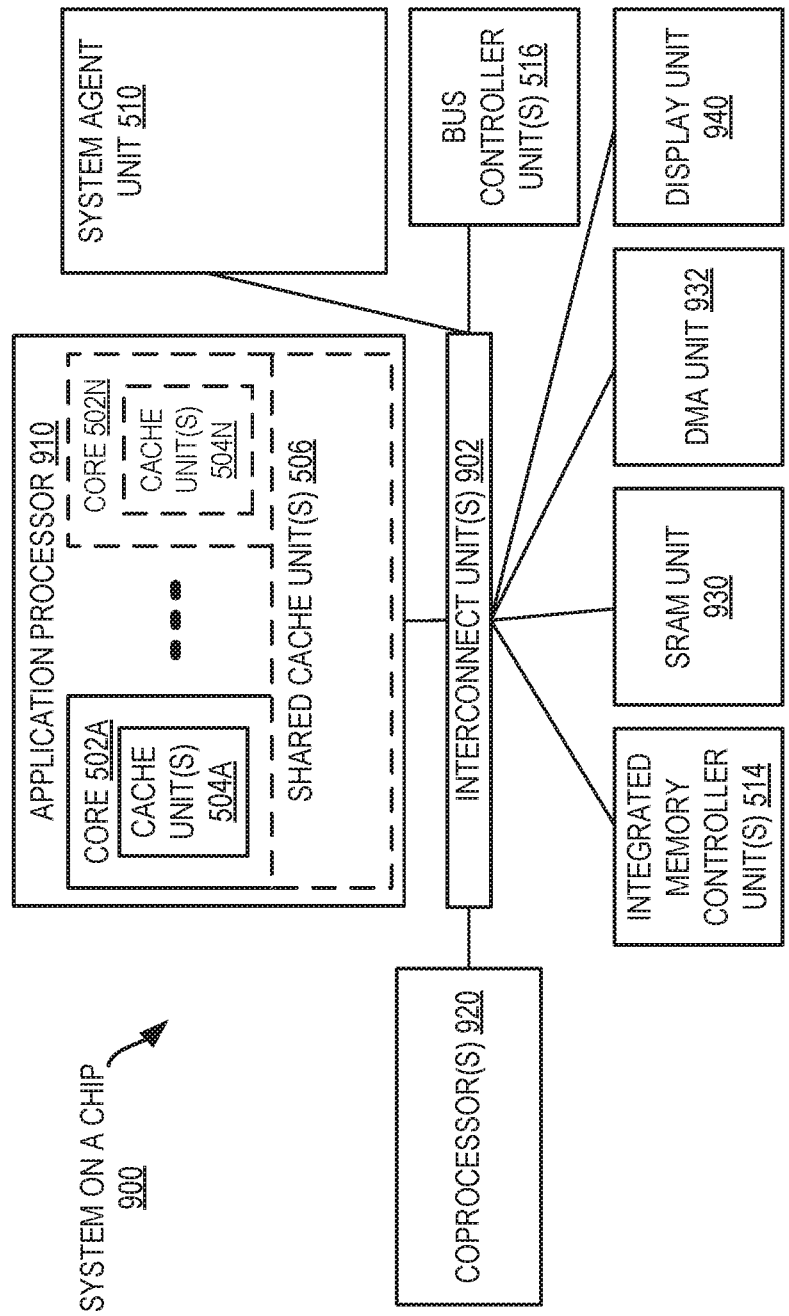
FIG. 9 is a block diagram of a SoC in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; a static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In this specification, operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
   first circuitry to use a first weight value to weight operating system (OS) priority information to generate a first weighted priority value;
   second circuitry to use a second weight value to weight system-on-chip (SoC) hardware priority information to generate a second weighted priority value;
   third circuitry to use a third weight value to weight platform priority information to generate a third weighted priority value;
   fourth circuitry to sum the first weighted priority value, the second weighted priority value, and the third weighted priority value to generate a quality of service (QoS) value for an SoC interconnect transaction; and
   an arbiter to use the QoS value to prioritize the SoC interconnect transaction on an SoC interconnect;
   wherein the prioritized SoC interconnect transaction is executed on the SoC.

2. The apparatus of claim 1, wherein the SoC hardware priority information comprises processor core hardware priority information.

3. The apparatus of claim 1, further comprising a first register to store the OS priority information.

4. The apparatus of claim 3, wherein the first register is to receive the OS priority information from a scheduler.

5. The apparatus of claim 3, wherein the first register is to receive the OS priority information from a page table entry.

6. The apparatus of claim 3, wherein the first register is to receive the OS priority information from a context identifier.

7. The apparatus of claim 1, wherein the platform priority information is from a resource manager.

8. The apparatus of claim 1, wherein the first weight and the second weight are programmable.

9. A method comprising:
   weighting operating system (OS) priority information to generate a first weighted priority value;
   weighting system-on-chip (SoC) hardware priority information to generate a second weighted priority value;
   weighting platform priority information to generate a third weighted priority value;
   summing the first weighted priority value, the second weighted priority value, and the third weighted priority value to generate a quality of service (QoS) value for an SoC interconnect transaction; and
   using the QoS value to prioritize the SoC interconnect transaction for arbitration for an SoC interconnect;
   wherein the prioritized SoC interconnect transaction is executed on the SoC.

10. The method of claim 9, further comprising receiving the OS priority information from a scheduler.

11. The method of claim 9, further comprising receiving the OS priority information from a page table entry.

12. The method of claim 9, further comprising receiving the OS priority information from a context identifier.

13. The method of claim 9, further comprising programming a first weight for weighting the OS priority information and programming a second weight for weighting the SoC hardware priority information.

14. A system-on-chip (SoC) comprising:
    an interconnect;
    first circuitry to use a first weight value to weight operating system (OS) priority information to generate a first weighted priority value;
    second circuitry to use a second weight value to weight system-on-chip (SoC) hardware priority information to generate a second weighted priority value;
    third circuitry to use a third weight value to weight platform priority information to generate a third weighted priority value;
    fourth circuitry to sum the first weighted priority value, the second weighted priority value, and the third weighted priority value to generate a quality of service (QoS) value for an SoC interconnect transaction; and
    an arbiter to use the QoS value to prioritize the first interconnect transaction on the interconnect;
    wherein the prioritized first interconnect transaction is executed on the SoC.

15. The SoC of claim 14, further comprising an application processor core and a graphics processor core, wherein the SoC hardware priority information comprises application processor core hardware priority information.

16. The SoC of claim 15, wherein the arbiter is to use the QoS value to arbitrate between the first interconnect transaction and a second interconnect transaction for use of the interconnect, wherein the second interconnect transaction is from the graphics processor core.

17. The SoC of claim 14, further comprising a resource manager to provide the platform priority information to the fourth circuitry.

* * * * *